Aug. 31, 1943. A. BECKER 2,328,407
GROUND REFLECTOR
Filed June 14, 1939 2 Sheets-Sheet 1

Inventor:
Arthur Becker

Aug. 31, 1943.   A. BECKER   2,328,407
GROUND REFLECTOR
Filed June 14, 1939   2 Sheets-Sheet 2
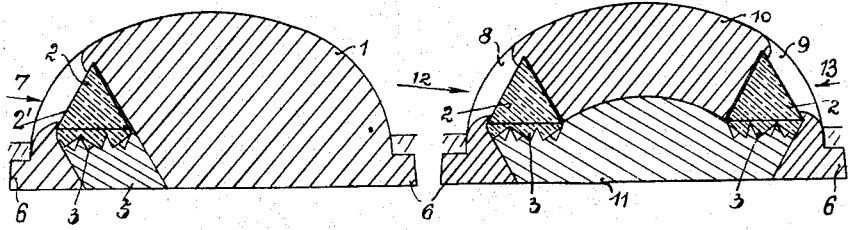
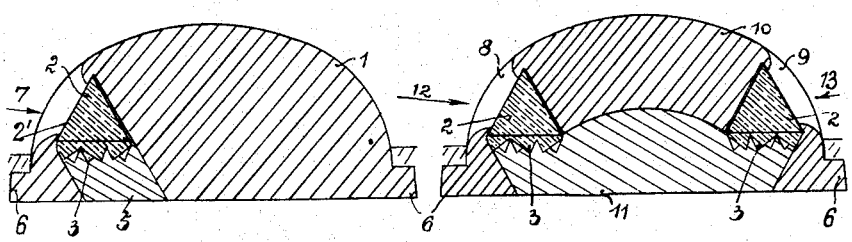
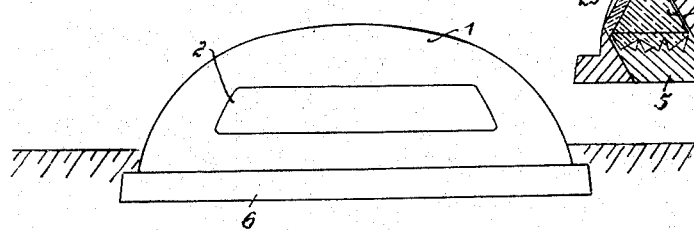
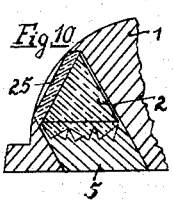
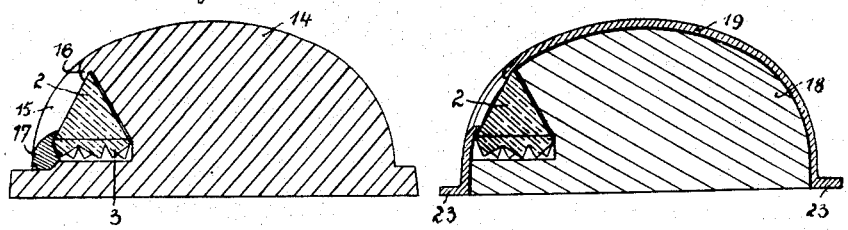
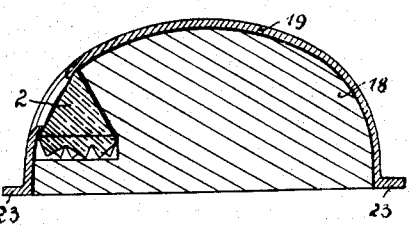
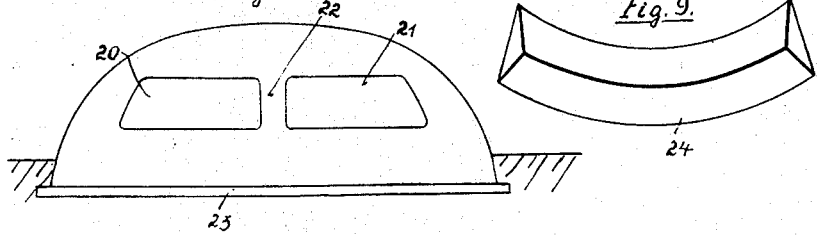
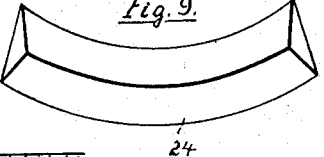
Inventor:
Arthur Becker Patented Aug. 31, 1943

2,328,407

UNITED STATES PATENT OFFICE 2,328,407

GROUND REFLECTOR

Arthur Becker, Berlin-Niederschoneweide, Germany; vested in the Alien Property Custodian Application June 14, 1939, Serial No. 279,227
In Germany August 10, 1938

2 Claims. (Cl. 88—79)

Ground reflectors are already known for aerodromes but however, these have the object of directing the light upwards. With these ground reflectors a calotte projecting above the surface of the ground is used.

According to the invention the calotte or stud is provided with a recess for the reception of a prism which is arranged with its lower side on top of a coloured reflector.

These ground reflectors are mainly for use on roads. They are sunk into the surface of the road and can be run over by any vehicle. The ground reflectors are arranged at certain distances with several one behind the other in the longitudinal direction of the road, or transverse to the road. In the first case they may replace the white line arranged in the known way in the middle of the road. In the latter case they are used for halt roads, pedestrian crossings and the like. The ground reflectors project the rays of light coming from the headlamps of a vehicle back to the vehicle. They thus form good indicators for every motor driver, especially in fog, with dimmed lights and in overtaking vehicles and the like, so that they considerably increase the safety of driving.

The calotte may be formed as a complete glass member and have a recess in its undersurface for the insertion of the prism with the reflector, which are both fixed in the calotte by means of a castable mass as for example cement. The calotte may consist of metal as for example iron, artificial substances especially pressable materials, cement or any desired materials or bodies which are especially resistant to pressure and bumps, and may be provided with a window against which is arranged the side of the prism which has to be directed towards the oncoming light. The construction may also be such that the calotte is covered by a metal cap which is provided with one or more openings. The metal calotte or the calotte covered with an iron cap are very resistant and adapted to withstand the strongest pressures when run over by heavy waggons without being damaged.

The invention is illustrated by various constructional forms in the drawings and these show:

Figure 1 a cross section through the ground reflector.

Figure 2 an interior elevation of the calotte.

Figure 3 is a vertical section through another form of the invention.

Figure 4 is an elevation of the device shown in Figure 3.

Figure 5 is a vertical section through still another modification of the invention.

Figure 6 is a vertical section through another modified ground reflector.

Figure 7 is a vertical section through a ground reflector having a special cap.

Figure 8 is an elevation of the form of the invention disclosed in Figure 7.

Figure 9 is a perspective view of one type of prism used with the devices of the invention.

Figure 10 is a partial vertical section through a ground reflector illustrating the use of a transparent closure for a window of the device.

Figure 1:
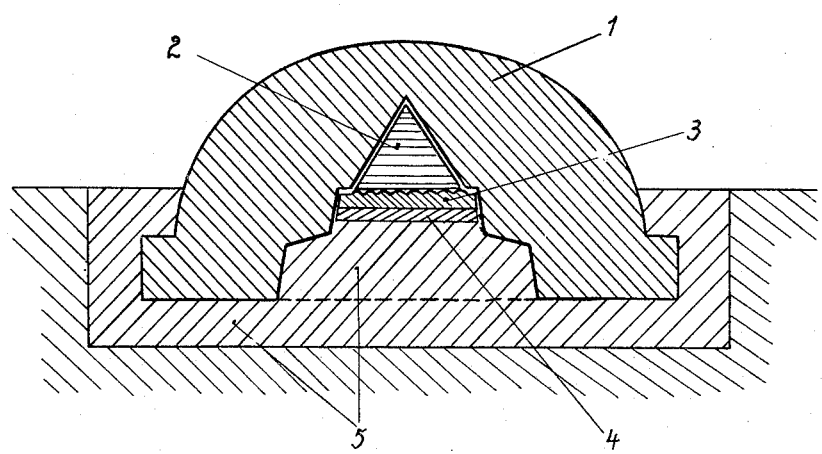
Figure 2:
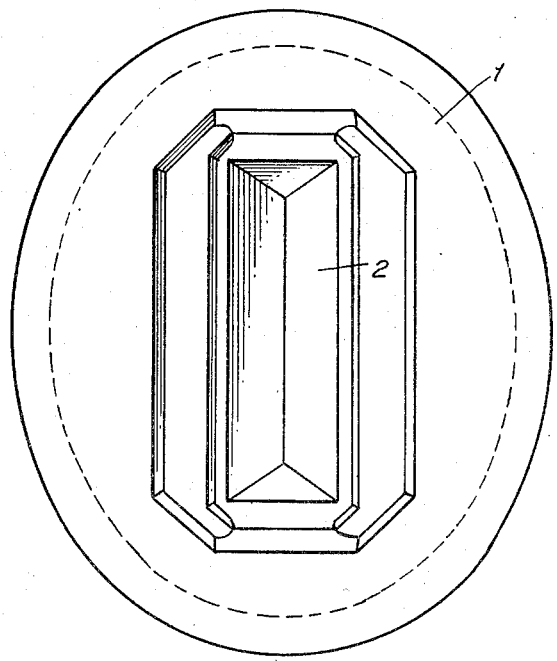

The ground reflector is as shown in Figure 1 sunk in the road surface. The glass calotte 1 which is formed as an integral glass member only projects a little above the upper surface of the road and possesses a ring shaped edge for insertion below the surface. In its outer periphery it is for example of ellipse shape as shown in Figure 2. The glass calotte 1 has in its lower surface a recess for the insertion of an equilateral glass prism 2. The recess in the underside of the glass calotte is suited to the periphery of the prism 2 which is inserted in it. The side of the prism which is not enclosed by the calotte is situated over a reflector 3. This may have a reflecting paint on its underside or instead a special reflecting glass mounting 4 may be provided. The parts 2, 3 and 4 are fixed by a castable mass 5, for example, cement. The prism 2 as shown in Figure 1 has a certain space between it and the walls of the glass calotte. The ground reflector directs the light rays coming from the headlamps of a vehicle back in each driving direction, so that the ground reflector appears illuminated to the driver of a vehicle. The light rays falling on the ground reflector are refracted by the prism 2 downwards to the reflector 3 and by the reflector and the prism 2 are directed back in the reverse direction, so that for every vehicle the ground reflector which is let into the upper surface of the road appears illuminated when it is dark. In the construction according to Figures 3 and 4 the calotte 1 consists for example of iron and has a coloured layer more especially red on its upper surface which may be produced by burning in enamelling or the like. In the calotte 1 a recess is provided in its undersurface which extends through the body of the calotte to form a window. In this recess a prism 2 is inserted from below which is arranged over the coloured reflector 3 and is arranged with the side 2, which has to be directed towards the oncoming light, at the window of the calotte.

Figure 1 shows that the calotte body has abutment lips at the window which prevents the prism, which is inserted in the recess in the undersurface of the calotte from falling out. The recess in the undersurface of the calotte below the reflector 3 is filled for example with cement 5. The calotte is provided with a rabbeted edge 6 which is inserted in the upper surface of the road. The light rays from the headlamps of a vehicle fall on the prism 2 somewhat in the direction of the arrow 7, are refracted by this perpendicularly downwards to the reflector 3 and reflected back by this and the prism in the reverse direction. Figure 4 shows the ground reflector which lies transverse to the direction of travel 7.

The ground reflector illustrated in Figure 5 has two windows 8 and 9 in which are inserted the prisms 2 and their reflectors 3. The recess, on the underside of the calotte 10 which in this case also consists of metal, that is to say, the space 11, is conveniently filled with cement. The construction is in the main the same as in Figures 3 and 4. The ground reflector according to Figure 5 acts in both directions of travel so that it projects back in the reverse direction the light rays coming somewhat in the direction 12 or 13.

Figure 6 shows a ground reflector which consists of a calotte 14 of metal, and which is provided with a coloured covering for example red. The window 15 of this calotte is here formed by a lateral recess in the calotte which is closed by its lower side. In this recess the prism 2 with the reflector 3 is inserted from the side. The calotte body may form an abutment lip on the upper side 16 for preventing the prisms falling out. On the other three sides special abutment lips 17 are provided which are attached to the calotte body and protect the prism from falling out. The construction may be so arranged that instead of a lateral recess in the calotte body a through going opening (bore) is provided in which the prism 2 with the reflector 3 is inserted until it is in the correct position in relation to the window 15 whereupon the ends of the through going opening are closed by suitable props.

The calotte body may also be covered with a specially resistant metal cap. Such a construction is shown in Figures 7 and 8. In this the calotte body 18 consists for example of a pressed mass which is provided with a lateral recess for the insertion of the prism 2 with the reflector 3. The calotte body 18 is now covered by a calotte shaped metal cap 19 which has a coloured, preferably a red, covering and has one or more recesses for the entrance of the light rays falling on the prism. Figure 8 shows that the metal cap 19 is provided with recesses 20 and 21 which are separated from one another by a bar 22. Behind these recesses 20 and 21 there lies the prism 2. On the metal cap 19 there is provided at its periphery a ring shaped abutment rib 23 by which the pressure exerted on the ground reflector when it is being run over is taken as much as possible by the metal cap for protecting the calotte 18.

The metal cap 19 can also be used for ground reflectors which are intended to act in two or more directions in which cases they are provided with corresponding recesses or windows. Furthermore the metal cap may also be provided over ground reflectors like those in Figures 3 and 4 in which the calotte itself consists of iron.

The prism together with the reflector may be suited to the shape of the calotte and be correspondingly curved. Such a prism 24 is shown in Figure 9.

In all the constructional forms the prism 2 and the reflector 3 may be made in one piece.

The windows provided in the calotte or in the calotte shaped metal cap may be filled with a transparent plate 25 (Figure 10) of hard glass, Celluloid or other transparent material. The plate is inserted in the window from the inside. The plate is bevelled at its edges and is inserted in the opening to a certain extent in a swallow tailed shape whereby the falling out of the plate from the opening is prevented.

The calotte may consist of light metal. The calotte or the ground reflector may be inserted in a coloured ground plate which is sunk in the surface of the road so that the upper surface of this plate lies in the same plane as the upper surface of the road. The plate may for example consist of coloured asphalt more especially red asphalt.

What I claim is:

1. A ground reflector including a calotte formed with a light-admission recess opening through one wall thereof, a reflector arranged at the bottom of the recess in the horizontal plane of the calotte, and a triangular prism having one face resting upon the reflector and another face bridging the light entrance to the recess in the calotte, said recess extending through the bottom of the calotte and supporting material inserted in the recess in contact with the reflector whereby to support the reflector, the edge of the entrance opening in the recess in the side of the calotte overlying and bearing upon the inserted prism to maintain the prism in position.

2. In a ground reflector having a calotte type of body in which reflecting means are mounted, the combination with a solid body provided with an opening extending through the body and having an entrance in a side of the body of support material engaged within a portion of said opening away from said entrance, a reflector positioned within said opening in the horizontal plane of the body and supported by said support material, an equilateral triangular shaped prism within said opening, one face of said prism being supported on said reflector, a second face of said prism lying across the entrance of said opening, and means for retaining the prism in mounted position on said reflector comprising lips on the surface of said body adjacent said opening which overlap and abut a portion of the prism surface which bridges said opening.

ARTHUR BECKER.